C. HOERL.
FRICTION CLUTCH.
APPLICATION FILED AUG. 9, 1912.

1,073,685.

Patented Sept. 23, 1913.

3 SHEETS—SHEET 1.

WITNESSES:
Harry E. Pfeiffer
Fredk. E. W. Fraentzel

INVENTOR:
Conrad Hoerl,
BY Fraentzel and Richards,
ATTORNEYS

C. HOERL.
FRICTION CLUTCH.
APPLICATION FILED AUG. 9, 1912.

1,073,685.

Patented Sept. 23, 1913.
3 SHEETS—SHEET 3.

WITNESSES:
Harry E. Pfeiffer
Fredk. H. W. Fraentzel

INVENTOR:
Conrad Hoerl.
BY
Fraentzel and Richards
ATTORNEYS

UNITED STATES PATENT OFFICE.

CONRAD HOERL, OF NEWARK, NEW JERSEY.

FRICTION-CLUTCH.

1,073,685.  Specification of Letters Patent.  Patented Sept. 23, 1913.

Application filed August 9, 1912. Serial No. 714,146.

*To all whom it may concern:*

Be it known that I, CONRAD HOERL, a citizen of the United States, residing at Newark, in the county of Essex and State of New Jersey, have invented certain new and useful Improvements in Friction-Clutches, and do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in friction-clutches for power transmission; and, the present invention relates, more particularly, to a novel and simply constructed friction-clutch mechanism which possesses great strength and power, and yet is so constructed as to be easily and quickly thrown into and out of its clutching or operative relation.

The present invention has for its principal object to provide a friction clutch mechanism provided with a plurality of expanding rings which are mounted to move eccentrically to the circumference or friction surface of a friction drum, and thus when engaged by the rotating friction drum said expanding rings are caused to more tightly and firmly grip the surface of said drum in proportion to the increase of the load to which the clutch mechanism is subjected.

Other objects of the present invention not at this time more particularly enumerated will be clearly understood from the following detailed description of the said invention.

With the various objects of the present invention in view, the said invention consists, primarily, in the general arrangements and combinations of the various devices and parts, as well as in the details of the construction of the same, all of which will be hereinafter more fully set forth, and then finally embodied in the clauses of the claim which are appended to and which form an essential part of this specification.

The invention is clearly illustrated in the accompanying drawings, in which:—

Figure 1:
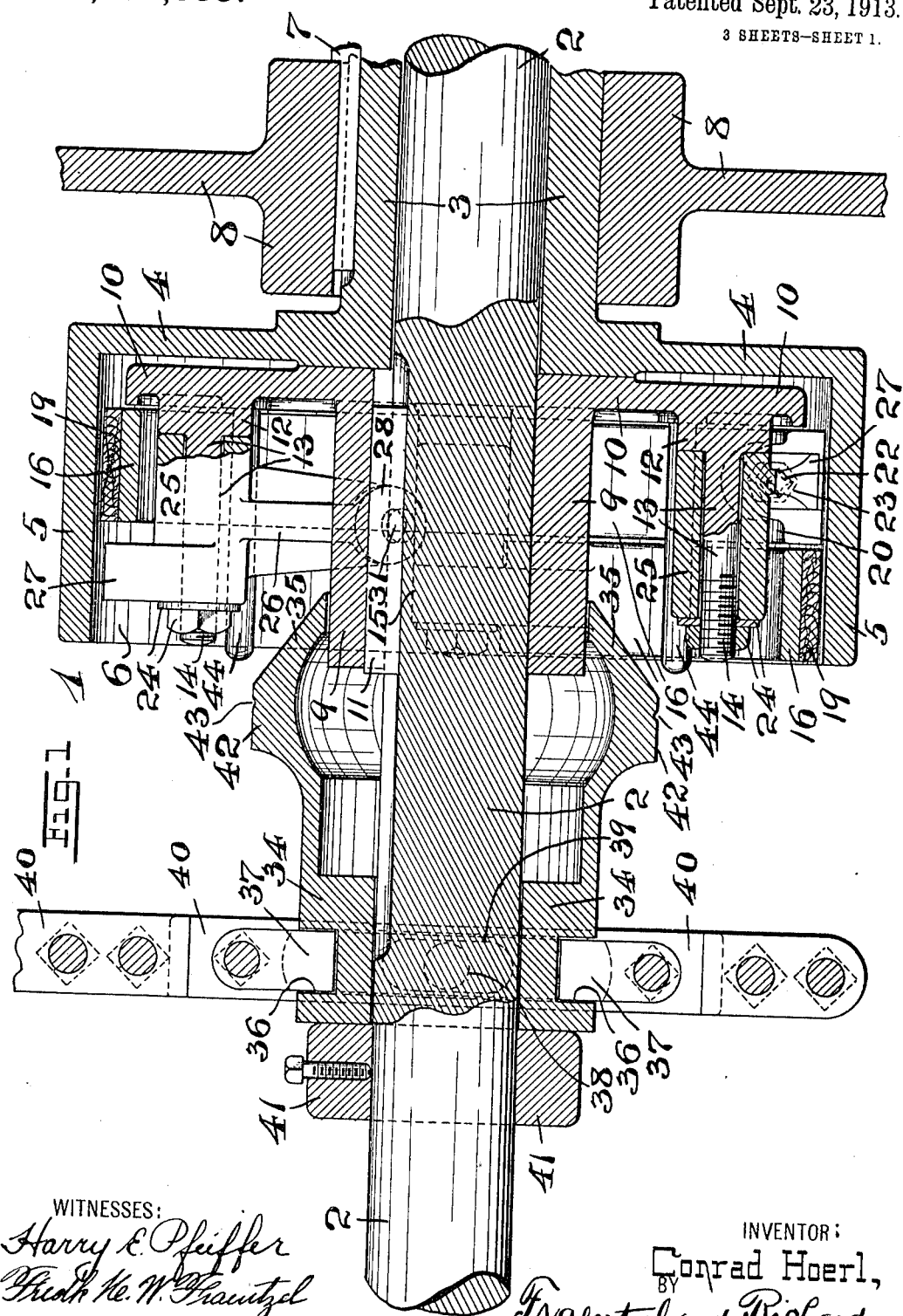
Figure 2:
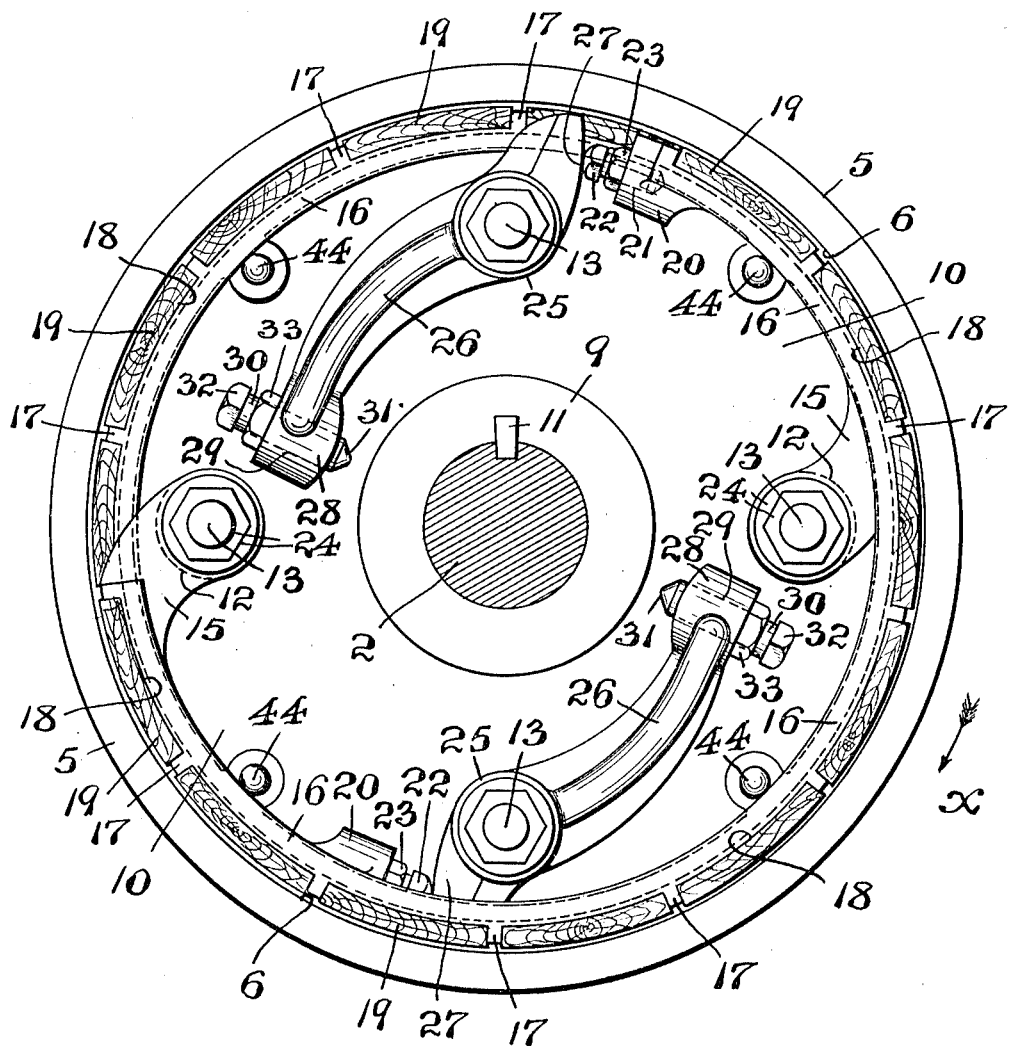
Figure 3:
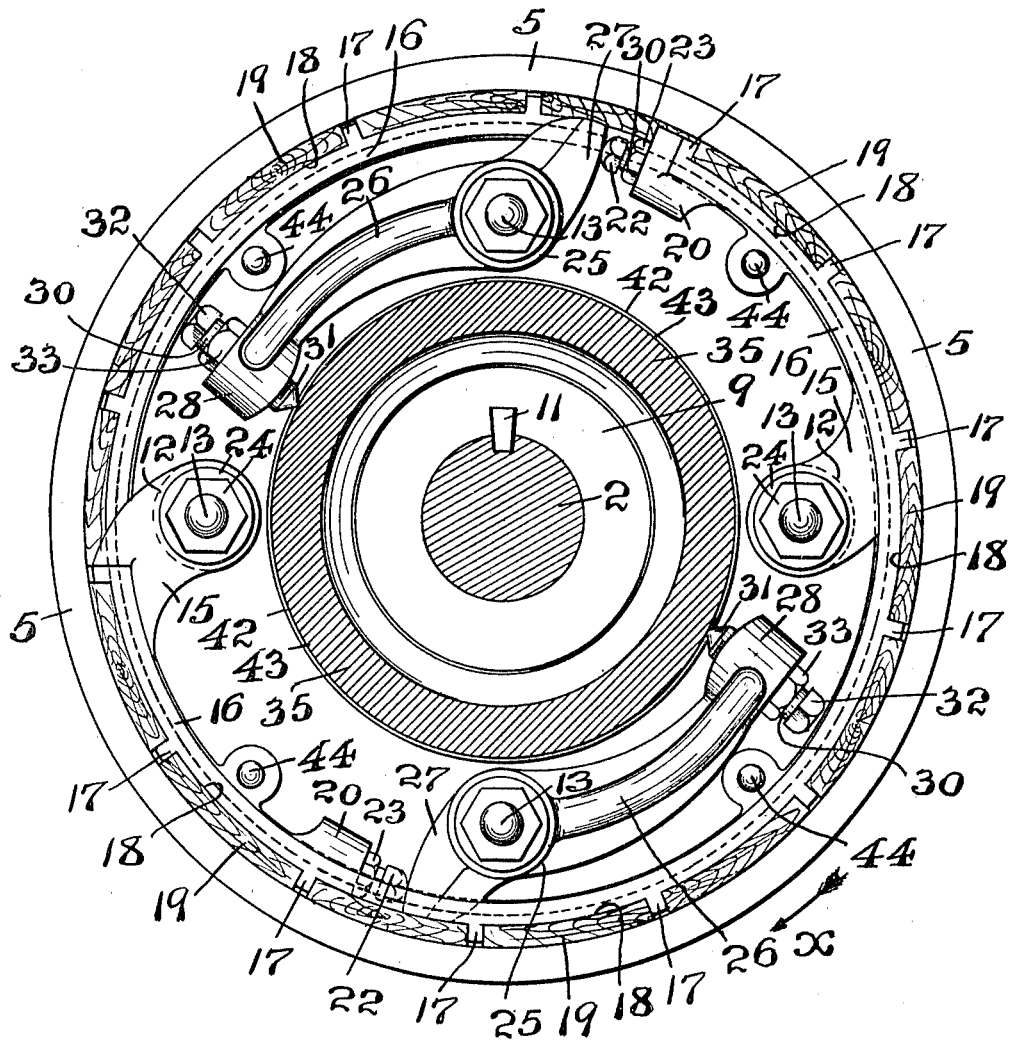

Figure 1 is a longitudinal vertical section of the novel clutch mechanism made according to and embodying the principles of the present invention, the same being shown in its released or inoperative position; Fig. 2 is a transverse section of the same illustrating the interior parts of the clutch mechanism in their released or inoperative positions; and Fig. 3 is a similar transverse section of the same illustrating the said interior parts of the clutch mechanism in their clutching or operative positions.

Similar characters of reference are employed in all of the above described views to indicate corresponding parts.

Referring now to the several figures of the drawings, the reference-character 1 indicates the complete clutch-mechanism made according to and embodying the principles of the present invention, the same comprising a shaft 2, upon which is loosely or rotatably mounted the sleeve 3 of a drum member 4 provided with an outwardly projecting annular flange 5, the inner surface 6 of which provides a friction surface adapted to be engaged by the gripping or clutching elements of the clutch-mechanism. Secured upon said sleeve 3, by means of a key 7, or any other suitable fastening means, is a driving pulley 8, by means of which said drum-member 4 is driven or rotated from the source of power.

The reference-character 9 indicates the hub of a carrying-disk or plate 10, which is secured or fixed upon said shaft 2 by means of a key 11, or any other suitable form of fastening means. Said carrying-disk or plate 10 is located within the interior of said drum-member 4, and is provided with a plurality of suitably disposed bosses 12 from which project outwardly studs or posts 13, the latter being provided at their free ends with externally disposed screw-threads 14. Mounted pivotally upon one pair of said oppositely disposed studs or posts 13 are the eccentric pivoting arms 15 which are connected with one end of each of a plurality of expanding rings 16. The outer surface of said expanding rings 16 are provided with transversely disposed and suitably spaced ribs or flanges 17 which provide a multiplicity of intervening receiving sockets or spaces 18, in which are arranged friction-blocks 19, the latter being made of wood, cork or any other suitable material. The free end of each expanding ring is provided with a suitable boss or enlarged member 20, which is provided with an internally screw-threaded longitudinally extending opening or socket 21 adapted to receive the screw-threaded shank of an adjustable butt-post or member 22, the same being provided with a lock-nut 23 for securing the same in its adjusted position with relation to said expanding ring 16. Said eccentric pivoting arms 15 of said expanding rings 16 are maintained in their proper pivotal relation to said studs or posts 13 by means of a nut and washer 24 which engage said external screw-threads of said studs or posts 13, or any other suitable fastening means may be employed for that purpose.

Mounted pivotally upon another pair of oppositely disposed studs or posts 13 are the hub-members 25 of operating-levers or dogs 26. Projecting from said hub-members 25 are the cam-portions 27, which are so disposed that when said operating-levers or dogs 26 are moved in a proper direction said cam-portions 27 will move into engagement with said butt-posts or members 22 of said expanding-rings 16, whereby the latter are operated or moved into frictional or binding engagement with said friction surface 6 of said drum-member 4. The free ends of said operating-levers or dogs 26 are provided with terminal-members 28 in each of which is located a transverse internally screw-threaded opening 29. Engaging said openings 29 are adjustable rider-studs 30, the free ends 31 of which project from one side of said terminal-members 28. The oppositely projecting ends of said rider-studs 30 are provided with squared heads 32, to which may be applied a wrench or other device for turning said rider-studs to adjust their relation to said terminal-members 28, a lock-nut 33 being provided to lock said rider-studs in the desired adjusted position.

Slidably mounted upon said shaft 2 is the hub-portion 34 of wedge-cone 35. Said hub-portion 34 is provided with an annular channel or groove 36 in which is mounted a split-collar or ring 37, the latter possessing a pair of oppositely extending studs 38. Said studs 38 are engaged by the slots 39 of a pivoted shifting-lever 40, which thus serves to slide said wedge-cone into and out of engagement with said operating-levers or dogs 26 to operate said clutch-mechanism. Secured upon said shaft 2, in any suitable manner, is a collar 41 which serves to limit the rearward movement of said wedge-cone 35 as operated by said shifting lever 40. Said wedge-cone 35 is further provided in its high surfaces 42 with an annular groove 43 of slight depth adapted to engage said free ends 31 of said rider studs 30 of said operating-levers or dogs 26, when said wedge-cone 35 is moved into operative engagement therewith.

The reference-character 44 indicates a plurality of guide or positioning pins which are secured to and which project outwardly from said carrying-disk or plate 10. Said pins 44 extend laterally across the inner sides of said expanding rings 16, and serve to retain as well as to aid in returning said expanding rings to their normal initial position.

When in use the above described novel construction of friction-clutch operates as follows:—The shifting-lever 40 is operated to move forward said wedge-cone 35, the inclined surfaces of which engaging said free ends 31 of said rider-studs 30 cause the same to ride upwardly upon the high surface 42 and into the shallow groove 43 of said wedge-cone, thus causing a pivotal movement of said operating-levers or dogs 26 which carries into operating engagement with said butt-posts 22 of said expanding-rings 16 the said cam-portions 27 of said operating-levers or dogs 26. This movement of the cam-portions 27 pressing against one end of each expanding-ring 16 causes the latter to expand and conform themselves to the friction surface 6 of said drum-member 4, which they are thus caused to frictionally engage. Owing to the pivotal connection of one end of each expanding-ring 16 with one of the studs or posts 13 by means of said eccentric pivoting arms 15 a further and important operation of the expanding-rings ensues, namely, as the said rings are expanded they pivot or turn slightly at their pivoted end which carries the said end into contact with said friction surface 6 of said drum-member 4, since the direction in which the said drum-member rotates is the same as the direction of this movement of the expanding ring (as indicated by the arrows $x$ in Figs. 2 and 3 of the drawings) it follows that when contact of the pivoted end of the expanding-ring with the friction surface 6 of the drum-member is obtained there is immediately consequent a drag or pull upon said expanding ring tending to pull the same around its pivotal connection, but since the said pivoting-arm 15 is set eccentric with relation to the said drum-member this tendency results in forcing or wedging more tightly than ever said expanding ring against the friction surface 6. Through this means and operation any tendency of the clutch to slip is reduced to a minimum and yet the expanding rings may be quickly and easily released from such frictional engagement when the pressure of the cam-portions 27 on their free ends is released or removed. Upon an opposite movement or withdrawal of said wedge-cone 35, thus releasing the pressure of the same upon said operating-levers or dogs 26, the residual tension or spring which results from the expansion of the expanding-rings 16 tends to cause the same to resume their normal circumference, thus causing the same to spring or move away from said friction-surface 6 of said drum-member 4. This springing away of the rings from said drum-member brings the said expanding-rings into engagement or contact with the positioning or guide-pin 44 which is located nearest the free end of said expanding rings before the same have completely resumed their normal initial position, and being thus stopped the tension of the ring is now exerted to move the ring longitudinally, so that the same slides over said positioning-pin 44 causing a reverse pivotal movement of the pivoted end of said expanding-ring which withdraws the latter from its wedged relation to said drum-member and finally returns the same to its normal initial position. Of course it will be understood that the above releasing movements of the expanding-rings is almost instantly accomplished as soon as the pressure of the cam-portions 27 upon the free ends of said expanding rings is removed.

When it is desired to have the direction of drive changed, the expanding-rings and operating-levers or dogs are removed and their positions reversed, the same being constructed and designed so as to be thus reversible. It is merely necessary to the proper operation of the expanding-rings that they be so mounted in connection with said carrying-disk or plate 10 that their free ends extend away from their pivoted ends in a direction opposite to the direction of rotation of the driven drum-member 4. It will be further understood that a suitable pulley or other device is mounted upon the shaft 2 so as to be rotated thereby, when the latter is driven by the clutch mechanism, so that the machinery to be operated is connected by the clutch mechanism with the source of power.

In order to assure a proper adjustment so that the throw or movement of the operating-levers or dogs 26 by said wedge-cone 35 is properly governed to move and place upon the expanding rings the required pressure, the said rider-studs are provided in the ends or terminal-members of said operating-levers or dogs, and said rider-studs are adjustable through their threaded connection with said terminal-member to advance or withdraw the free ends of said rider-studs and thus change the position of said cam-portions 27 as they normally engage the said butt-posts 22 of the said expanding-rings.

When the friction-blocks 19 of the expanding-rings 16 wear the same may be set up to a proper normal position with relation to the friction surface 6 of said drum-members 4 by adjusting said butt-posts 22 which will increase the expansion of the said expanding-rings as caused by said operating levers or dogs 26 sufficiently to take up or compensate for such wear of the friction-blocks 19.

I am fully aware that some changes may be made in the general arrangements and combinations of the several devices and parts of the above described clutch mechanism, as well as in the details of the construction of said parts, without departing from the scope of my present invention, as set forth in the foregoing specification, and as defined in the claims which are appended thereto. Hence, I do not limit my invention to the exact arrangements and combinations of the devices and parts as herein described, and as illustrated in the accompanying drawings, nor do I confine myself to the exact details of the construction of the said parts.

I claim:—

1. In a device of the kind described, a shaft, a drum-member rotatably mounted on said shaft, a carrying-disk rigidly connected upon said shaft, an expanding-ring provided with an eccentric pivoting arm for pivotally connecting one end of said expanding-ring with said carrying-disk, a plurality of friction blocks carried upon the outer surface of said expanding-ring, an operating-lever pivotally mounted in connection with said carrying-disk and provided with a cam-portion adapted to engage the free end of said expanding-ring to move the same into frictional engagement with said drum-member, positioning and guiding pins mounted upon said carrying-disk and adapted to be engaged by the inner surface of said expanding-ring, and means for moving said operating-lever to operate said expanding-ring.

2. In a device of the kind described, a shaft, a drum-member rotatably mounted on said shaft, a carrying-disk rigidly connected upon said shaft, an expanding-ring provided with an eccentric pivoting arm for pivotally connecting one end of said expanding ring with said carrying-disk, a plurality of friction blocks carried upon the outer surface of said expanding-ring, an operating-lever pivotally mounted in connection with said carrying-disk and provided with a cam-portion adapted to engage the free end of said expanding-ring to move the same into frictional engagement with said drum-member, positioning and guiding pins mounted upon said carrying-disk and adapted to be engaged by the inner surface of said expanding-ring, and means for moving said operating-lever to operate said expanding-ring, comprising a wedge-cone slidably mounted upon said shaft, and means for moving said wedge-cone into and out of contact with said operating lever.

3. In a device of the kind described, a shaft, a drum-member provided with an annular flange rotatably mounted on said shaft, a carrying-disk rigidly connected upon said shaft, outwardly projecting posts connected with said carrying-disk, a spring-like expanding-ring having a circumference greater than a semi-circle, an eccentric pivoting arm connected with one end of said expanding-ring pivotally mounted upon one of said posts, a plurality of friction-blocks carried upon the outer surface of said extending ring, an operating-lever pivoted upon another of said posts, a cam-portion connected with said operating-lever adapted to engage the free end of said expanding-ring to move the same into frictional engagement with the annular flange of said drum-member, means for guiding and positioning said expanding-ring, an adjustable rider-stud in the end of said operating-lever, a wedge-cone slidably mounted upon said shaft, and means for moving said wedge-cone into and out of contact with the rider-stud of said operating-lever, substantially as and for the purposes set forth.

4. In a device of the kind described, a shaft, a drum-member provided with an annular flange rotatably mounted on said shaft, a carrying-disk rigidly connected upon said shaft, outwardly projecting posts connected with said carrying-disk, an expanding-ring, an eccentric pivoting arm connected with one end of said expanding-ring pivotally mounted upon one of said posts, a plurality of friction-blocks carried upon the outer surface of said expanding-ring, an adjustable butt-post connected with the free end of said expanding-ring, an operating-lever pivoted upon another of said posts, a cam-portion connected with said operating-lever adapted to engage the said butt-post at the free end of said expanding-ring to move the same into frictional engagement with the annular flange of said drum-member, an adjustable rider-stud in the end of said operating-lever, a wedge-cone slidably mounted upon said shaft, and means for moving said wedge-cone into and out of contact with the rider-stud of said operating-lever, substantially as and for the purposes set forth.

5. In a device of the kind described, a shaft, a drum-member provided with an annular flange rotatably mounted on said shaft, a carrying-disk rigidly connected upon said shaft, outwardly projecting posts connected with said carrying-disk, an expanding-ring, an eccentric pivoting arm connected with one end of said expanding-ring pivotally mounted upon one of said posts, a plurality of friction-blocks carried upon the outer surface of said expanding-ring, an adjustable butt-post connected with the free end of said expanding-ring, positioning and guiding pins mounted upon said carrying-disk and adapted to be engaged by the inner surface of said expanding-ring, an operating-lever pivoted upon another of said posts, a cam-portion connected with said operating-lever adapted to engage the said butt-post at the free end of said expanding-ring to move the latter into frictional engagement with the annular flange of said drum-member, and means for moving said operating-lever to operate said expanding-ring.

6. In a device of the kind described, a shaft, a drum-member provided with an annular flange rotatably mounted on said shaft, a carrying-disk rigidly connected upon said shaft, outwardly projecting posts connected with said carrying-disk, an expanding-ring, an eccentric pivoting arm connected with one end of said expanding-ring pivotally mounted upon one of said posts, a plurality of friction-blocks carried upon the outer surface of said expanding-ring, an adjustable butt-post connected with the free end of said expanding-ring, positioning and guiding pins mounted upon said carrying-disk and adapted to be engaged by the inner surface of said expanding-ring, an operating-lever pivoted upon another of said posts, a cam-portion connected with said operating-lever adapted to engage the said butt-post at the free end of said expanding-ring to move the latter into frictional engagement with the annular flange of said drum-member, an adjustable rider-stud transversely mounted in the end of said operating-lever, a wedge-cone slidably mounted upon said shaft, and means for moving said wedge-cone into and out of contact with the rider-stud of said operating-lever to oscillate the latter to operate said expanding-ring, substantially as and for the purposes set forth.

7. In a device of the kind described, a rotatable drum-member, a carrying-disk, a spring-like expanding ring eccentrically pivoted with relation to the circumference of said drum-member to said carrying-disk, the free end of said expanding ring extending around within said drum-member in a direction opposite to the direction of rotation of said drum-member, and for a distance greater than a semi-circle, said expanding ring being capable of being sprung or expanded into contact with said drum-member and also being capable of a slight pivotal movement toward said drum-member, and means for guiding and positioning said expanding-ring, substantially as and for the purposes set forth.

8. In a device of the kind described, a rotatable drum-member, a carrying-disk, an expanding-ring eccentrically pivoted, with relation to the circumference of said drum-member, to said carrying-disk, the free end of said expanding-ring extending around within said drum-member in a direction opposite to the direction of rotation of said drum-member, said expanding ring being capable of being sprung or expanded into contact with said drum-member and also being capable of a slight pivotal movement toward said drum-member, means mounted upon said carrying-disk for thus moving said expanding ring into frictional engagement with said drum-member, and means for guiding the movement of said expanding-ring, substantially as and for the purposes set forth.

9. In a device of the kind described a rotatable drum-member, a carrying-disk, an expanding-ring eccentrically pivoted, with relation to the circumference of said drum-member, by one end to said carrying-disk, the free end of said expanding ring extending around within said drum-member in a direction opposite to the direction of rotation of said drum-member, said expanding ring being capable of being sprung or expanded into contact with said drum-member and also being capable of a slight pivotal movement toward said drum-member, means for guiding the movement of said expanding-ring and means for thus moving said expanding-ring into frictional engagement with said drum-member, comprising an operating lever pivotally mounted upon said carrying-disk, a cam-portion at one end of said operating-lever adapted to be moved by the oscillation of said operating-lever into operative engagement with the free end of said expanding-ring, and a wedge-cone adapted to be carried into engagement with the free end of said operating-lever for oscillating the same, substantially as and for the purposes set forth.

10. In a device of the kind described a rotatable drum-member, a carrying-disk, an expanding ring eccentrically pivoted, with relation to the circumference of said drum-member, by one end to said carrying-disk, the free end of said expanding ring extending around within said drum-member in a direction opposite to the direction of rotation of said drum-member, said expanding ring being capable of being sprung or expanded into contact with said drum-member and also being capable of a slight pivotal movement toward said drum-member, positioning and guiding pins projecting from said carrying-disk and adapted to be engaged by the inner surface of said expanding-ring, substantially as and for the purposes set forth.

11. In a device of the kind described a rotatable drum-member, a carrying-disk, an expanding ring eccentrically pvioted, with relation to the circumference of said drum-member, to said carrying-disk, the free end of said expanding ring extending around within said drum-member in a direction opposite to the direction of rotation of said drum-member, said expanding ring being capable of being sprung or expanded into contact with said drum-member and also being capable of a slight pivotal movement toward said drum-member, positioning and guiding pins projecting from said carrying-disk and adapted to be engaged by the inner surface of said expanding-ring, and means for thus moving said expanding-ring into frictional engagement with said drum-member, substantially as and for the purposes set forth.

12. In a device of the kind described a rotatable drum-member, a carrying-disk, an expanding-ring eccentrically pivoted, with relation to the circumference of said drum-member by one end to said carrying-disk, the free end of said expanding ring extending around within said drum-member in a direction opposite to the direction of rotation of said drum-member, said expanding ring being capable of being sprung or expanded into contact with said drum-member and also being capable of a slight pivotal movement toward said drum-member, positioning and guiding pins projecting from said carrying-disk and adapted to be engaged by the inner surface of said expanding-ring, and means for thus moving said expanding-ring into frictional engagement with said drum-member, comprising an operating lever pivotally mounted upon said carrying-disk, a cam-portion at one end of said operating-lever adapted to be moved by the oscillation of said operating-lever into operative engagement with the free end of said expanding-ring, and a wedge-cone adapted to be carried into engagement with the free end of said operating-lever for oscillating the same, substantially as and for the purposes set forth.

13. In a device of the kind described, an expanding-ring provided at one end with an eccentric arm for pivotally mounting the same, and provided at its free end with a longitudinally projecting adjustable butt-post.

14. In a device of the kind described, an expanding-ring provided at one end with an eccentric arm for pivotally mounting the same, and provided at its free end with a longitudinally projecting adjustable butt-post, and means for locking said butt-post in its adjusted position.

15. In a device of the kind described, a shaft, a drum-member provided with an annular flange rotatably mounted on said shaft, a carrying-disk rigidly connected upon said shaft, a plurality of equally spaced posts projecting outwardly from said carrying-disk, a pair of expanding-rings, an eccentric pivoting arm connected with one end of each expanding ring, said pair of expanding-rings being pivotally mounted by means of their eccentric pivoting arms upon oppositely disposed posts, said expanding-rings extending longitudinally from their pivoted ends in a direction opposite to the direction of rotation of said drum-member, a plurality of friction-blocks carried upon the outer surface of each expanding-ring, an adjustable butt-post connected with the free end of each expanding-ring, positioning and guiding pins mounted upon said carrying-disk and adapted to be engaged by the inner surfaces of said pair of expanding-rings, a pair of operating-levers pivotally mounted upon oppositely disposed posts, a cam-portion connected with each operating-lever adapted to respectively engage said butt-posts of said pair of expanding-rings to move the latter into frictional engagement with the annular flange of said drum-member, and means for oscillating said operating lever to operate said expanding-rings.

16. In a device of the kind described, a shaft, a drum-member provided with an annular flange rotatably mounted on said shaft, a carrying-disk rigidly connected upon said shaft, a plurality of equally spaced posts projecting outwardly from said carrying-disk, a pair of expanding-rings, an eccentric pivoting arm connected with one end of each expanding-ring, said pair of expanding-rings being pivotally mounted by means of their eccentric pivoting arms upon oppositely disposed posts, said expanding rings extending longitudinally from their pivoted ends in a direction opposite to the direction of rotation of said drum-member, a plurality of friction-blocks carried upon the outer surface of each expanding-ring, an adjustable butt-post connected with the free end of each expanding-ring, positioning and guiding pins mounted upon said carrying-disk and adapted to be engaged by the inner surfaces of said pair of expanding-rings, a pair of operating-levers pivotally mounted upon oppositely disposed posts, a cam-portion connected with each operating-lever adapted to respectively engage said butt-posts of said pair of expanding-rings to move the latter into frictional engagement with the annular flange of said drum-member, an adjustable rider-stud transversely mounted in the end of each operating-lever and projecting outwardly therefrom, a wedge-cone slidably mounted upon said shaft, and means for moving said wedge-cone into and out of contact with the rider studs of said operating-levers to oscillate the latter to operate said expanding-rings.

In testimony, that I claim the invention set forth above I have hereunto set my hand this 7th day of August, 1912.

CONRAD HOERL.

Witnesses:
 FREDK. C. FRAENTZEL,
 FREDK H. W. FRAENTZEL.